Oct. 12, 1948.  L. SPRARAGEN  2,451,450
WEATHER STRIP
Filed Nov. 5, 1943
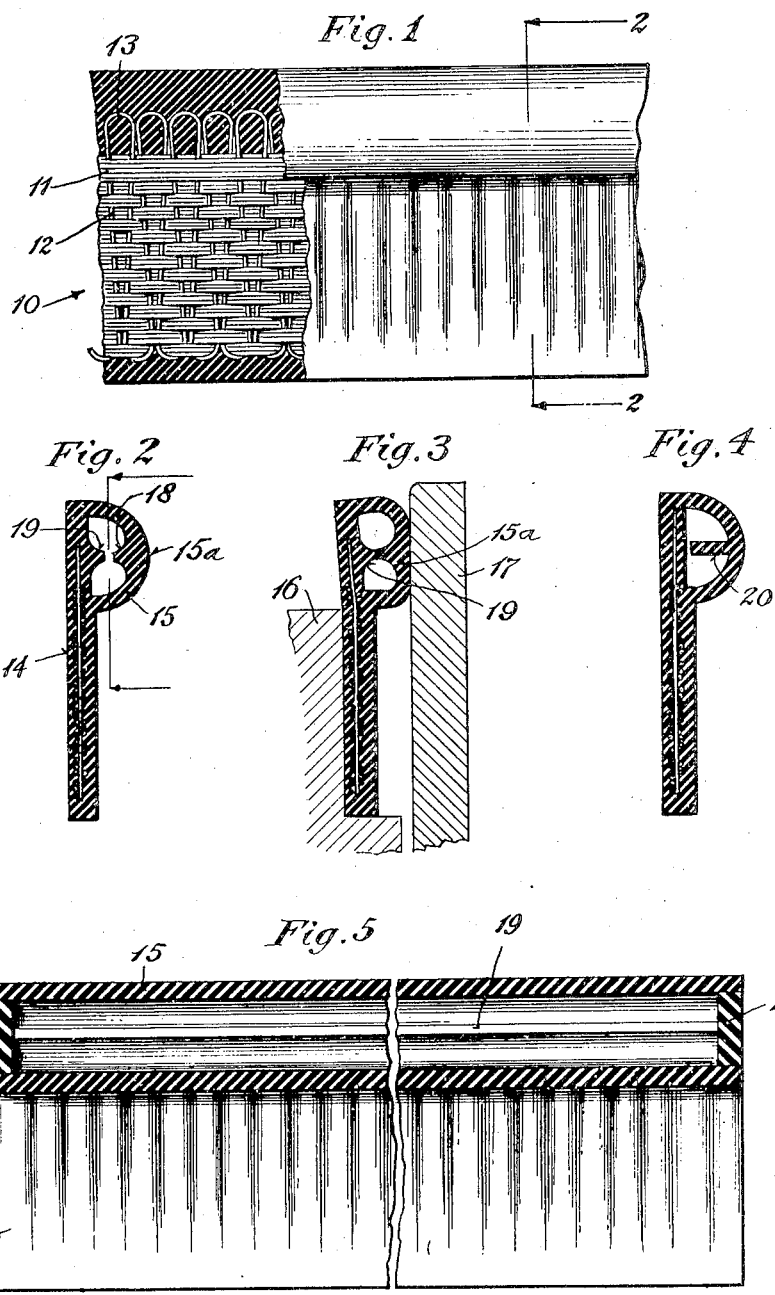
INVENTOR
Louis Spraragen,
BY Johnson and Kline
ATTORNEYS Patented Oct. 12, 1948

2,451,450

UNITED STATES PATENT OFFICE 2,451,450

WEATHER STRIP

Louis Spraragen, Bridgeport, Conn., assignor to Bridgeport Fabrics, Inc., Bridgeport, Conn., a corporation of Connecticut Application November 5, 1943, Serial No. 509,021

5 Claims. (Cl. 20—69)

The invention relates to sealing strips such as are utilized as weather strips or beading strips for doors or the like closures.

The present invention provides a unitary structure which includes a strip of resilient material which is enclosed by covering material, the cover material also forming a hollow bead along one edge thereof.

The cover may be of rubber, rubber substitutes, resins, such as vinyl resins, or like tough, flexible wear-resisting materials.

A feature of the invention is the provision of means within the hollow bead for resisting distortion thereof and thus enables a relatively thin walled bead to form an effective seal.

In one form of the invention, this means comprises ribs extending substantially perpendicular to the contacting surface of the bead and operating preferably after a limited inward movement of the bead, for supporting and resisting further inward movement.

In another form of the invention, the cover material is impervious and a fluid is sealed under slight pressure within the hollowed bead so as to tend to resist deformation of the bead in sealing position.

Preferably, the resilient attaching strip extends under the base of the bead so as to provide a cantilever support for the bead to urge the same into sealing position.

Other features and advantages of the invention will be apparent from the specification and claims when considered in connection with the drawings in which:

Figure 1 shows a front view, partly in section, of the strip of the present invention.

Fig. 2 is a sectional view taken along line 2—2 of Fig. 1.

Fig. 3 is a view similar to Fig. 2 showing the sealing strip in position with the reenforcing ribs supporting the contacting surface and the cantilever action of the attaching strip forcing the bead into sealing position.

Fig. 4 is a view similar to Fig. 2 of another form of the invention.

Fig. 5 shows a front view partly in section of another form of the invention showing the sealed ends of the bead.

The sealing strip of the present invention consists of a resilient strip 10 herein illustrated as comprising a woven strip having textile warps 11 and spring wire wefts 12 with the wires projecting from one edge thereof in loops 13 as shown in Fig. 1.

The resilient strip may also take the form of any of the resilient strips shown and described in my copending application, Serial No. 270,582 filed April 28, 1939, now Patent No. 2,347,158, granted April 18, 1944, or in my Patent No. 2,299,955, granted October 27, 1942.

The resilient strip has a cover 14 therearound completely enclosing the strip and preferably interlocking with the loops to form an integrated structure. The cover material extends laterally from one face of the strip to form a hollow bead 15 and provide the sealing strip with a substantially P-shaped cross-section as is best shown in Figs. 2 to 4.

The cover material may be rubber, rubber substitutes, extrudable or moldable resins, such as "Vinylite," or any tough, flexible wear-resisting material.

The surface 15a of the bead which extends substantially parallel to the resilient strip is intended to be the contacting surface. Preferably, the sealing strip is mounted by the staff of the P as shown in Fig. 3 with the bead portion of the strip projecting beyond the end of the frame 16 so that when the closure member 17 is moved into closed position, the resilient strip will deflect and act as a cantilever-support for the bead for maintaining it in good sealing relation with the closure.

The cover and bead may be extruded on the resilient strip so that a unitary homogenous sealing unit is provided.

A feature of the present invention resides in the provision of means within the hollow bead for resisting deformation of the bead and particularly inward movement of the contacting surface when in sealing position.

As is shown in Fig. 2, in one form of the invention a rib 18 is formed on the inner surface of the bead substantially perpendicular to the contacting surface thereof and a similar rib 19 is formed on the inner opposite wall of the bead with a gap between the two equal to the desired amount of inward movement of the contacting surface and distortion of the bead. The resilient strip 10, as shown in this figure extends beyond the rib 19 so as to form a solid backing or base therefor and also may extend, as shown in Fig. 4 so that it substantially underlies the whole bead and forms a base therefor.

It will be seen that when the sealing strip is mounted about an opening, as shown in Fig. 3, and the contacting portion 15a moved to sealing position, the two ribs will engage after the contacting portion has moved inwardly the distance equal to the gap and will form a support for the contacting surface.

In the form of the invention shown in Fig. 4, the rib 20 is carried entirely by one side of the bead, herein illustrated as the contacting portion of the bead, and engages the opposite side of the bead after the contacting portion has moved inwardly the predetermined amount to close the gap. The desired amount of inward movement of the contacting surface will determine the length of the rib and the amount of gap.

With these constructions, it will be apparent that a relatively rigid support, acting in opposition to the force tending to distort the bead, will be had and hence a thinner walled bead may be utilized and still have a sufficient rigidity when in sealing position to effectively seal the opening.

In another form of the invention, the hollow bead which is of an impervious cover material is maintained against substantial inward movement of the contacting surface by means of a fluid under low pressure which is sealed within the hollow bead. The fluid may be either a gas or liquid so long as it is substantially incompressible. The fluid is entrapped or injected into the bead in any suitable manner and the ends are either plugged by resilient plugs 21 cemented or otherwise secured in place, as shown in Fig. 5, and thus sealed, or are sealed off by joining the walls of the bead at the end of the strip by the application of heat and pressure or by cement so that they are fluid tight.

Since the extruded P-shaped sealing strip may be made in long continuous lengths, the bead with the fluid therein may be pinched off or sealed by heat and pressure at predetermined desired intervals before the strip is severed into the desired lengths or the strip may be severed prior to the filling and sealing thereof.

In this form of the invention the bead too may have relatively thin walls and when the sealing strip is moved to the position shown in Fig. 3, the bead will slightly deform at the top and bottom as limited by the stretch in the material of the cover, but the contacting portion will be held in tight contact with the closure member through the medium of the entrapped fluid.

If desired, the entrapped fluid may be employed in beads of the type shown in Figs. 2 and 4 or in a plain hollow bead without the rib structure.

Variations and modifications may be made within the scope of this invention and portions of the improvements may be used without others.

I claim:

1. A sealing strip comprising an attaching strip; and a hollow bead carried thereby and having an internal rib substantially perpendicular to the contacting portion of the bead; another internal rib carried by the strip within the bead, said ribs having a combined depth less than the depth of the bead and positioned to engage one another after a limited inward movement of the contacting portion of the bead to support and hold the bead in sealing relation.

2. A sealing strip for movement into engagement with a fixed element comprising an attaching strip and a hollow bead carried by the attaching strip, said beading being pressed against the fixed element in sealing position and having a fluid under low pressure sealed therein and resisting deformation of said bead in sealing position.

3. A sealing strip comprising a flat strip having resilient members extending transversely for substantially the width thereof; and an outwardly nonadhesive cover of tough, flexible wear-resisting and impervious material enclosing the strip and having a hollow integral bead portion projecting therefrom along one face of the strip adjacent one edge thereof, said bead, when in sealing position, being urged into sealing relation by said resilient members and having a fluid under low pressure sealed therein and resisting deformation of the bead in said sealing relation.

4. A sealing strip comprising a flat strip having resilient members extending transversely for substantially the width thereof; and an outwardly nonadhesive cover of tough, flexible wear-resisting impervious material completely enclosing the strip and having a hollow integral thin-walled bead projecting along one face of the strip adjacent one edge thereof, the resilient members being the mounting means for the strip and extending under and forming part of the base of the bead and moving the bead into sealing relation and the bead having a fluid sealed therein to resist deformation thereof in said sealing relation.

5. A sealing strip comprising a flat strip having resilient means extending transversely for substantially the width thereof; and an outwardly nonadhesive extruded cover of tough, flexible wear-resisting material disposed over the strip and having a hollow integral projection forming a bead extending therefrom along one face of the strip adjacent one edge thereof and providing a sealing surface, said bead having integral inner rib means carried thereby normal to the opposed inner portion and having a depth less than the depth of the bead to be engaged after limited movement of the bead in sealing position and said hollow bead having a fluid sealed therein to further resist deformation thereof.

LOUIS SPRARAGEN.

REFERENCES CITED

The following references are of record in the file of this patent:

UNITED STATES PATENTS

| Number | Name | Date |
|---|---|---|
| 643,023 | Wood et al. | Feb. 6, 1900 |
| 1,928,992 | Clark et al. | Oct. 3, 1933 |
| 2,121,854 | Breer | June 28, 1938 |
| 2,161,666 | Cowen | June 6, 1939 |
| 2,217,875 | Nauert | Oct. 15, 1940 |
| 2,263,806 | Hammerl | Nov. 25, 1941 |
| 2,273,182 | Dodge | Feb. 17, 1942 |

FOREIGN PATENTS

| Number | Country | Date |
|---|---|---|
| 543,448 | Great Britain | Feb. 25, 1942 |